Sept. 19, 1961  V. F. RODICK ET AL  3,000,290
METHOD AND APPARATUS FOR VENTILATING POULTRY AND LIKE HOUSES
Filed Feb. 10, 1958  5 Sheets-Sheet 1

INVENTORS
Vernon F. Rodick
BY and Henry F. Rodick.

Fishburn and Gold
ATTORNEYS.

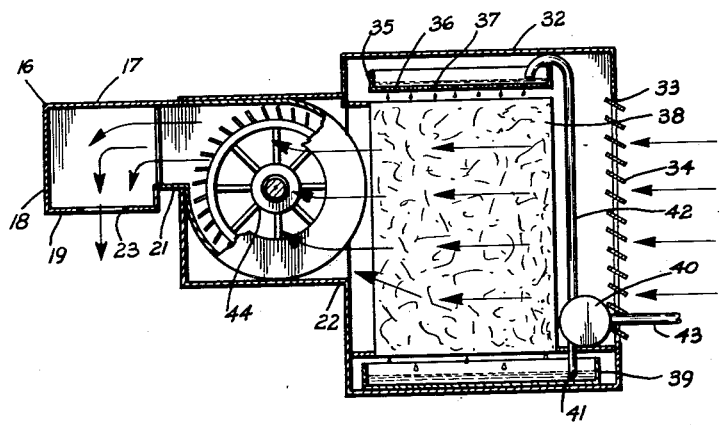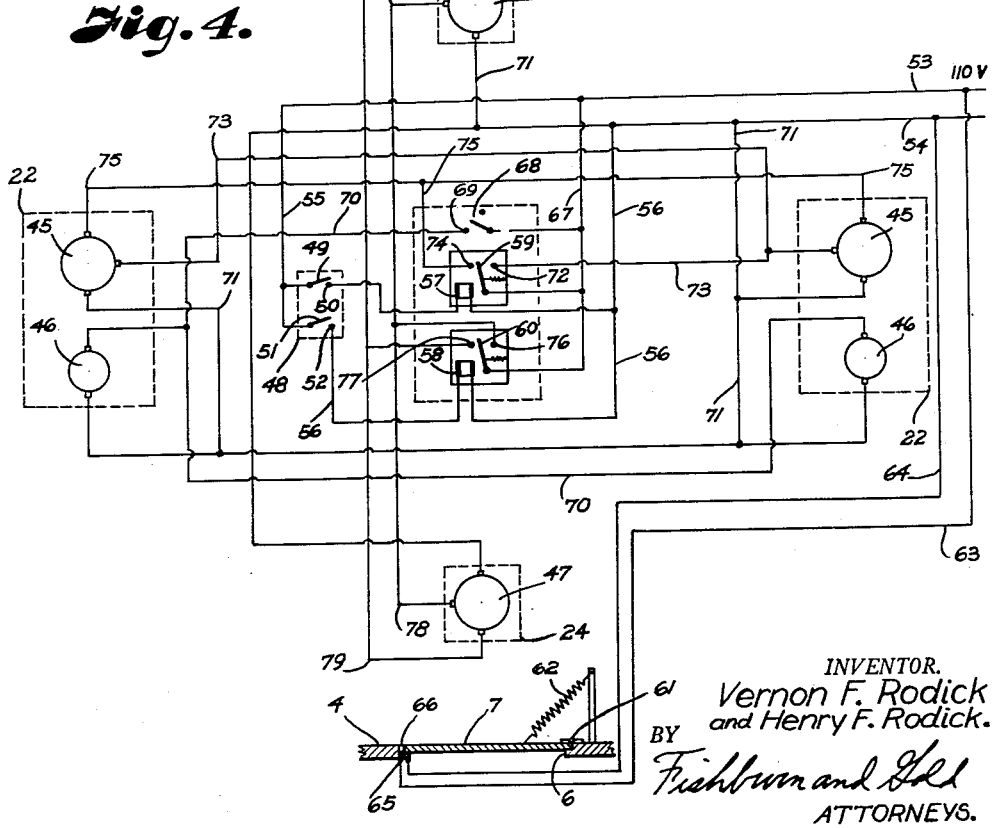

INVENTOR.
Vernon F. Rodick
and Henry F. Rodick.
BY
ATTORNEYS.

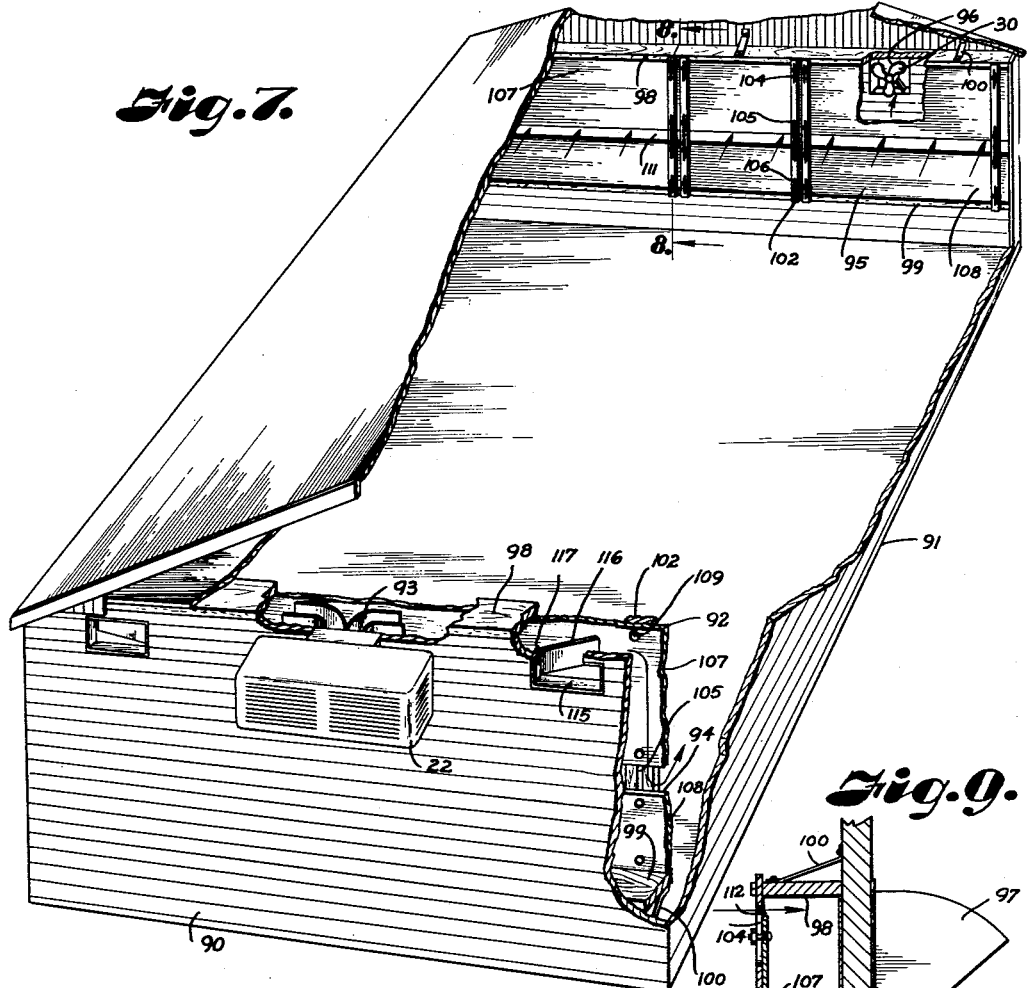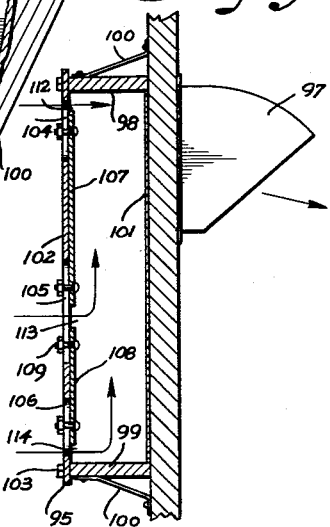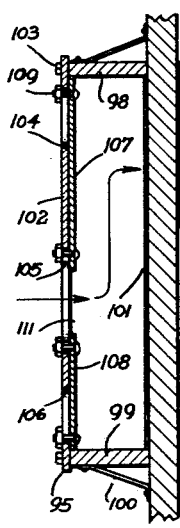

Sept. 19, 1961 V. F. RODICK ET AL 3,000,290
METHOD AND APPARATUS FOR VENTILATING POULTRY AND LIKE HOUSES
Filed Feb. 10, 1958 5 Sheets-Sheet 5

INVENTOR.
Vernon F. Rodick
BY and Henry F. Rodick.

ATTORNEYS.

United States Patent Office 3,000,290
Patented Sept. 19, 1961

3,000,290
METHOD AND APPARATUS FOR VENTILATING POULTRY AND LIKE HOUSES
Vernon F. Rodick and Henry F. Rodick, Sedalia, Mo., assignors to The Steam-O-Matic Corporation, Sedalia, Mo., a corporation of Missouri
Filed Feb. 10, 1958, Ser. No. 714,269
3 Claims. (Cl. 98—33)

This invention relates to the method and apparatus for ventilation of housing structures for poultry and animals, and more particularly to a novel method and apparatus for maintaining suitable conditions for the poultry and animals contained in the building or housing structure.

Recent practice in the poultry industry is to house the poultry in what may be called a "laying house" wherein hens are confined in cages and a large number of such cages are arranged in a building or housing for weather protection. The cages are open to the surrounding atmosphere so that the air may circulate therethrough. The cages are closely arranged for economy of space with only sufficient space therebetween for passage of operating attendants and for cleaning or otherwise maintaining the cages and poultry in the house. Also, there are what is known as "floor laying plans" wherein the hens are on the floor of the enclosed rooms or houses. The dense population in the enclosed rooms or house necessitates ventilation to remove odors and also supply fresh air to the hens or animals confined in the cages on the floors. Also, the hens or animals give off body heat which in the small rooms or housings, if not suitably ventilated, could result in increased temperatures and air conditions which would cause the hens to suffocate. Similar conditions are present in "battery house" operations and floor raising broiler houses.

The objects of the present invention are to provide ventilating apparatus including ducts and methods of operation wherein fresh outside air is moved and distributed into the poultry or animal containing room or housing and suitably exhausted therefrom to remove odors and some body heat from the room for maintaining suitable conditions therein; to provide such a ventilating system wherein the air is drawn from the outside and cooled as necessary before circulation through the house or room containing the poultry or animals; to provide such a system with controls and air moving and cooling devices for varying the velocity and path of movement of the air through the cage room or house; to provide such a ventilating system with laterally spaced inlet and outlet ducts in a room or housing above the cage level and extending substantially the length of the room or housing with openings in the ducts whereby change of velocity of the air alters the path of the air between the ducts; to provide a ventilating system with spaced inlet and outlet ducts having adjustable openings at various positions for facilitating and controlling the path and velocity of air movement in the housing; and to provide a method and apparatus for ventilating and air-conditioning poultry and like houses which is economical to manufacture with controls for the quantity and velocity of the air whereby suitable conditions are maintained therein.

In accomplishing these and other objects of the present invention, we have provided improved details of structure, the preferred forms of which are illustrated in the accompanying drawings, wherein:

FIG. 3 is a vertical sectional view through an evaporator cooler and blower and housing inlet duct for supplying air to the interior of the house.

FIG. 4 is a diagrammatic view of the electrical circuit for the controls and operating motors.

FIG. 7 is a perspective view of a poultry or animal house with a further modified form of ducts with adjustable openinge therein, portions of the house being broken away to better illustrate the arrangement therein.

FIG. 8 is a vertical sectional view through the exhaust duct on the line 8—8, FIG. 7.

FIG. 9 is a similar view to FIG. 8 with the duct members adjusted to change the openings therein.

Figure 1:
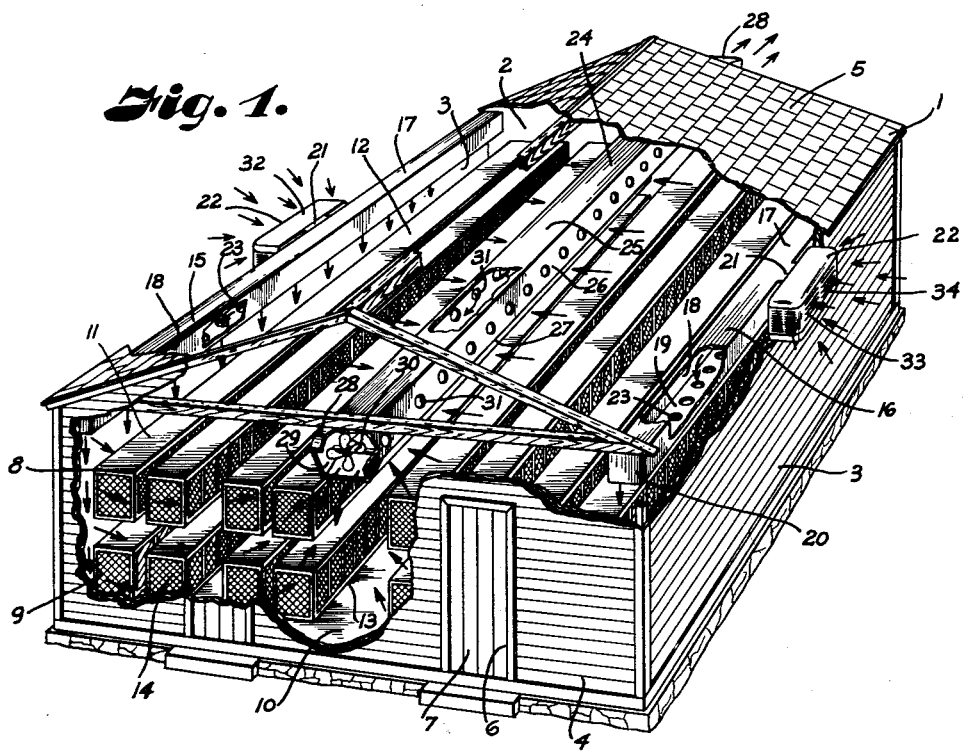
FIG. 1 is a perspective view of a poultry or animal house with ventilating equipment therein in accordance with the present invention with portions broken away to better illustrate the arrangement of the ducts.
Figure 2:
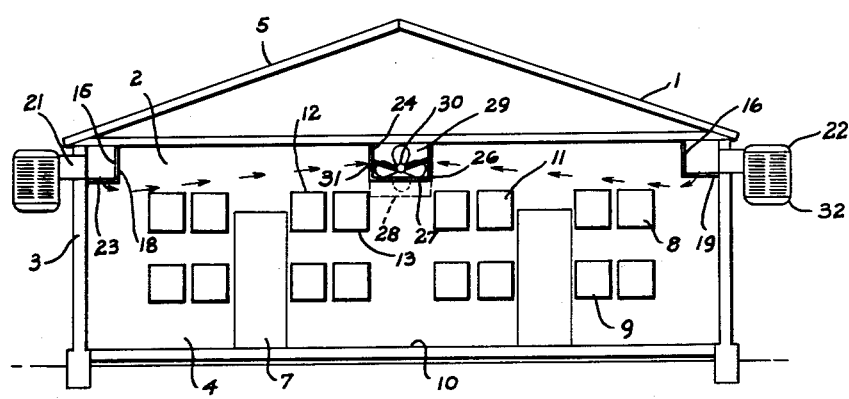
FIG. 2 is a diagrammatic vertical section through the house with arrows showing the air movement for winter operation.

Referring more in detail to the drawings:

Apparatus embodying the present invention is applicable to any suitable room or housing, and for illustration purposes, a housing 1 in the form of a building providing a confined space 2 to be conditioned. The building 1 has side walls 3, end walls 4 and a roof 5 suitably constructed and supported, with openings 6 in certain of the walls normally closed by doors or like closures 7 whereby the enclosed space 2 normally has no air circulation through window openings or the like.

A plurality of cages or cells 8 are arranged in spaced rows and tiers on supports (not shown) whereby the lower cages 9 are spaced from the floor 10 and upper cages 11 are spaced from the lower cages. The cages preferably have solid top and bottom walls 12 and 13 respectively and mesh side and end walls 14 whereby air can move through the cages. It is to be understood that the cages may be of various sizes or form or may be eliminated in floor raising operations.

In the form of the invention illustrated in FIGS. 1 to 4 inclusive, inlet ducts 15 and 16 are arranged in the space 2 at the upper portion of the side walls and extend substantially the length of the building 1. The ducts, as illustrated, are substantially square in cross section each with a top wall 17, side walls 18 and a bottom wall 19 with ends closed by end walls 20. Midway the length of each of the ducts are connections 21 with suitable evaporative coolers 22, said connections extending through the respective side walls 3, and the evaporative coolers being suitably mounted on the exterior of said side walls whereby said evaporative coolers 22 draw air from outside the housing 1 and discharge said air through the connections 21 into the ducts 15 and 16. A plurality of ports or holes 23 are arranged in spaced relation along the length of the bottom walls 19 of the respective ducts 15 and 16, said holes 23 being of suitable size relative to the quantity of air supplied by the coolers 22 to form jets of air directed toward the floor 10 of the housing. An exhaust duct 24 is arranged substantially midway between the ducts 15 and 16, and preferably substantially on the same elevation which is above the uppermost cage 11. The duct 24 is rectangular in cross section, having a top wall 25, side walls 26, bottom wall 27, and extends for the full length of the building 1. The ends of the duct 24 extend outwardly through the end walls 4 of the building 1 and are provided with a downturned discharge hood 28 at each end having an open end 29 to the exterior of the building. Exhaust fans 30 are located in the end portions of the duct 24 to draw air therefrom and discharge same exteriorly of the building. A plurality of spaced ports or holes 31 are arranged in each of the side walls 26 of the duct 24 whereby air from the interior of the building is drawn through the holes into the duct 24 and discharged exteriorly of the building by the operation of the fans 30.

The evaporative coolers 22 include housings 32 having an intake opening 33 with louvers 34 therein which are normally open. A water drip pan 35 is arranged in the upper portion of the housing 32 for containing a quantity of water, and the bottom 36 of said pan has a plurality of apertures 37 therein for dripping of water from the pan into a wettable filter or pad 38. The pad 38 is preferably formed of fibrous material loosely packed whereby air may be drawn therethrough. The bottom of the housing 32 has a water pan and reservoir 39 to catch water dripping from the pad or filter 38. A pump 40 has an intake 41 extending into the reservoir and a discharge duct 42 leading to the drip pan 35. A water supply pipe 43 is connected with the pump 40 for replenishing the supply of water when required. A blower 44 is arranged on the opposite side of the filter 38 relative to the intake opening 33 whereby operation of the blower draws air through the inlet and filter and discharges same through the respective connection 21 into the respective ducts 15 and 16. The blowers 44 are each driven by two-speed motors 45, and the pumps 40 are driven by motors 46, and the exhaust fans 30 are driven by two-speed motors 47.

In the summertime, when outside temperatures are above 80 degrees, the blowers 44 are operated at high speed for providing a large quantity of cooled air to the ducts 15 and 16, which air is discharged in jets through the openings 23 that force the cool air substantially to the floor 10 adjacent the side walls 3 throughout the length of the building 1. The exhaust fans 30 are operated at high speeds tending to draw the air laterally across the building interior through the cages and into the openings 31 in the duct 24. When the outside temperature is cold, the pumps 40 are not operated, and the blowers 44 are operated at low speed and the exhaust fans 30 operated at low speed whereby a small volume of air is moved through the building as illustrated by the arrows in FIG. 2, the air passing substantially across the top of the cages 8 in the upper portion of the tier providing ventilation. Under such operation, body heat given off by the poultry in the cages maintains sufficient warmth in the building and the low velocity air travel provides the necessary fresh air and ventilation.

A thermostat 48 controls the operation of the blower motors 45 and fan motors 47. For winter operation, the pumps 40 are disconnected, and when the temperature is above 48 degrees, the thermostat closes the circuit between contacts 49 and 50, and 51 and 52, whereby electric current from leads 53 and 54, connected to a suitable source of supply, flows through conductors 55 and 56 to relays 57 and 58 which operate switches 59 and 60 to control the motor for the exhaust fans and blowers respectively. In severe cold weather, it may be desirable to maintain a temperature of 52 degrees in the building; therefore, the thermostat is set to operate the relays to energize the motors 47 for operation at high speed, drawing air from the ducts 24 to induce the flow of air through the filter in the cooler housing 32, ducts 15 and 16 and interior of the space 2 to the duct 24 whereby filtered forced air ventilation is obtained. If the temperature should drop to 48 degrees, the thermostat 48 causes the relay 58 to change the circuit to the fan motors 47 whereby the fans operate at low speed. The body heat of the poultry or the like will gradually bring the temperature back to 52 degrees at which point the exhaust fans 30 operate at high speed. If the temperature inside of the space 2 should rise above 57 degrees, the thermostat 48 will energize the relay 57 to cause the blowers 44 to operate at low speed, forcing outside air through the filter 38, thereby increasing the volume of air circulated through the interior of the building. It is to be noted, however, that in this cold weather operation, there is no cold air blast on the poultry. The flow of air is substantially as shown by the arrows in FIG. 2, and the fresh cool air drifts downwardly through the cages and then picks up moisture and foul air as it rises and is exhausted by the fans.

During summer operation, the pumps 40 are connected and the blowers 44 operate at high speed and the exhaust fans operate at high speed for maximum cooled air circulation, and if the temperature should drop to an unseasonable low, the thermostat 48 energizes the relay 57 to operate the blowers 44 at low speed. If the temperature is extremely low for summer operation, the thermostat 48 will cause the relay 58 to operate and change the speed of the exhaust fan motors 47 to low speed. During the high speed operation of the blowers 44, the air flow through the building space 2 is as shown by the arrows in FIG. 1 where the air is driven at high velocity downwardly toward the floor 10 and then across through the cages and to the duct 24.

Each of the closures 7 are hingedly mounted as at 61 and provided with a spring 62 to swing the closures open. Each of the closures are provided with a fastening means for holding same in closed position during normal operation. If there is an interruption in the current flow to the electrical system, the lock is released whereby the spring 62 opens the doors for entry of outside air therethrough. In the form of the invention illustrated, conductors 63 and 64 are connected with the leads 53 and 54 respectively and lead to an electromagnet 65 to normally energize same whereby a metal member 66 on the closure 7 is held by the magnet, holding the closure in closed position. Interruption of the current de-energizes the magnet 65 whereby the spring 62 opens the closure 7.

In the circuit as shown in FIG. 4, the lead 53 is connected by a conductor 67 to the switch arms of the switches 59 and 60 and also to a switch arm of a switch 68 controlling the pump motor 46, the switch contact 69 being connected by a conductor 70 to the motor 46, the motors 45, 46 and 47 each being connected by a conductor 71 to lead 54. The switch 59 has a contact 72 connected by a conductor 73 to the low speed winding, and a contact 74 connected by a conductor 75 to the high speed winding of the blower motor 45. The switch 60 has contacts 76 and 77 connected by conductors 78 and 79 respectively to the low and high speed windings of the fan motors 47.

Figure 5:
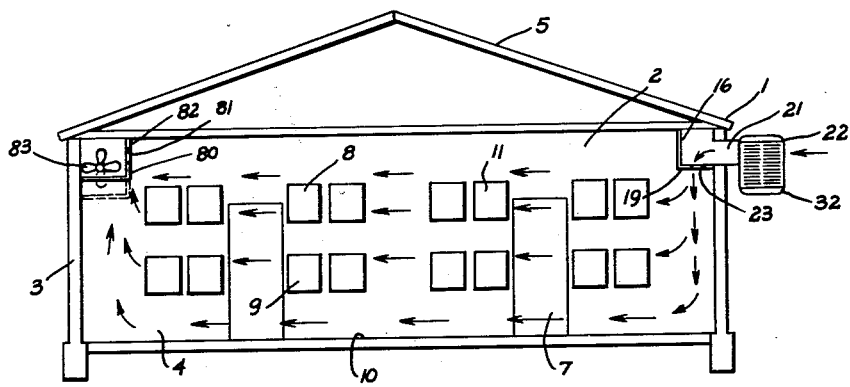
FIG. 5 is a diagrammatic vertical section through the house with a modified arrangement of the ducts therein.

In the form of the invention illustrated in FIG. 5, the building 1 has the interior space 2 with an evaporative cooler 22 outside of one side wall 3 communicating through a connector 21 with an intake duct 16 mounted in the space 2 at the upper portion of the wall 3, the duct 16 having discharge openings 23 in the bottom wall 19 thereof. At the upper portion of the other side wall 3 is an exhaust duct 80 having openings 81 in a side wall 82 thereof. The duct 80 extends for the length of the building and has open ends at which exhaust fans 83 are located to draw air from the duct 80. The operation of the evaporative cooler 22 and the blower therefor and the exhaust fans 83 are substantially the same as described in connection with the form of the invention illustrated in FIGS. 1 and 2. The arrangement of the ducts shown in FIG. 5 is particularly adapted for buildings having less width than the buildings in which the arrangement shown in FIG. 1 is used.

Figure 6:
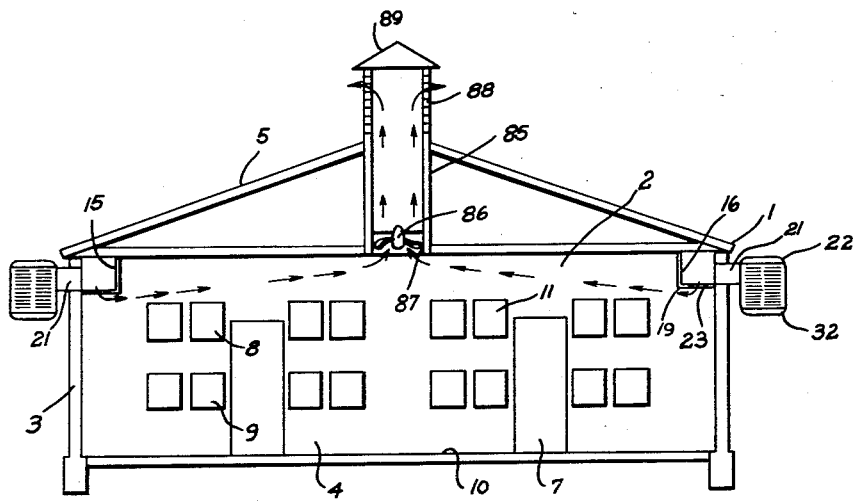
FIG. 6 is a diagrammatic vertical section through the house with a modified form of exhaust apparatus therein.

In the form of the invention illustrated in FIG. 6, the air conditioners or evaporative coolers 22 are connected with ducts 15 and 16 at the sides of the building 1 adjacent the upper portion of the side walls 3. The arrangement and operation thereof is substantially the same as shown in connection with the invention illustrated in FIGS. 1 to 4 inclusive. The exhaust of the air from the building space 2 is by a stack 85 preferably located substantially at the center of the building and having an exhaust fan 86 therein with the inlet opening 87 of said stack substantially on the level with the upper portions of the ducts 15 and 16. The stack 85 extends through the roof 5 of the building and has louvers or apertures 88 of suitable size whereby the air drawn by the fan 86 is discharged from the stack. A cover 89 is arranged on the stack for weather protection to keep rain or the like from entering same. The operation and control of the various motors for the blower, pumps and exhaust fans are substantially the same as described relative to the form of the invention illustrated in FIGS. 1 to 4 inclusive.

In the form of the invention illustrated in FIGS. 7 to 9 inclusive, the air conditioner or evaporative cooler 22 is arranged at an end wall 90 of a building 91 with the discharge of the cooler 22 connected through the end wall 90 with an inlet duct 92. Vanes or deflectors 93 are associated with the air conditioner discharge and arranged in the duct 92 to divide the cooled air and direct it in opposite directions in the duct. The air passes through suitable openings 94 in the duct into the interior of the house or building 91, enters an exhaust duct 95 arranged on the opposite wall and then through openings 96 in said opposite wall to the exterior of the building. Exhaust fans 30 are located in the openings 96 to draw the air therethrough and discharge it exteriorly of the building. A hood 97 is preferably arranged over the openings 96 to shield same from rain and the like. The ducts 92 and 95 are preferably of substantially identical structure and consist of vertically spaced top and bottom walls 98 and 99 respectively secured to the respective building wall and supported by suitable braces 100. A lining 101 such as plywood and the like is secured to the interior of the building wall between the top and bottom walls 98 and 99, as illustrated in FIG. 8. The ends of the duct are suitably closed, and in the illustrated structure the ducts extend to the side walls of the building and are closed thereby. A plurality of upright bars 102 are arranged in spaced relation along the length of the respective ducts with the end portions of said bars 102 engaging the edges of the top and bottom walls and suitably secured thereto by fastening devices 103. Each of the bars 102 have vertically extending slots therein, and in the illustrated structure each bar has upper slots 104, intermediate slots 105 and lower slots 106. Upper and lower duct panels 107 and 108 are arranged in the ducts in engagement with the bars 102 with suitable fastening devices such as bolts 109 extending through the slots 104, 105 and 106 whereby said bolts 109 may be loosened and the panels moved vertically relative to each other and the top and bottom walls of the duct to form and adjust the size of openings communicating the interior of the duct with the interior of the house or building.

In FIG. 8, the upper panels 107 are raised to their uppermost limit with the upper edges engaged with the top wall 98 and the lower panels 108 are moved to the lowermost extent of their travel and in engagement with the lower duct wall 99 to provide a relatively wide slot type opening 111 between the lower edges of the panels 107 and upper edges of the panels 108.

In the position shown in FIG. 9, the panels 107 and 108 have been moved to provide an opening 112 at the upper part of the duct, an opening 113 at the intermediate portion and an opening 114 at the lower portion of the duct. It is believed obvious that various arrangements of panels are contemplated whereby different size openings and various positions of same can be obtained and used singly or in combination in obtaining desirable air movement across the interior of the house from the inlet duct 92 to the outlet duct 95.

The end wall 90 has cooler bypass openings 115 spaced laterally from the air conditioner 22 and communicating the interior of the inlet duct 92 with the exterior of the building. Doors 116 are preferably hingedly mounted as at 117 on the interior of the wall 90 and arranged to close the openings 115. The hinge mountings 117 are on the side of the respective openings adjacent the air conditioner 22 whereby air delivered from the air conditioner 22 and directed laterally by the vanes 93 normally holds the closure doors 116 in opening closing position. When the blowers in the air conditioner 22 are not operating, and all air movement in the interior of the building is due to operation of the exhaust fans 30, the suction created by said exhaust fans tends to swing the doors 116 open whereby outside air is drawn through the openings 115 directly into the inlet ducts 92 for movement through the outlet openings therein for flow across the room to the outlet duct 95.

Electromagnetic latches or the like may be used to hold the doors 116 in closed position in the manner of the magnetic latch portions 65 and 66 to permit the initial opening of the doors 116 under controlled conditions wherein the electromagnets are de-energized. The doors 116 when open will be closed automatically when the blowers in the air conditioner 22 are started in operation. The operation and control of the various motors for the blower, pumps and exhaust fans are substantially the same as described relative to the form of the invention illustrated in FIGS. 1 to 4 inclusive.

Figure 10:
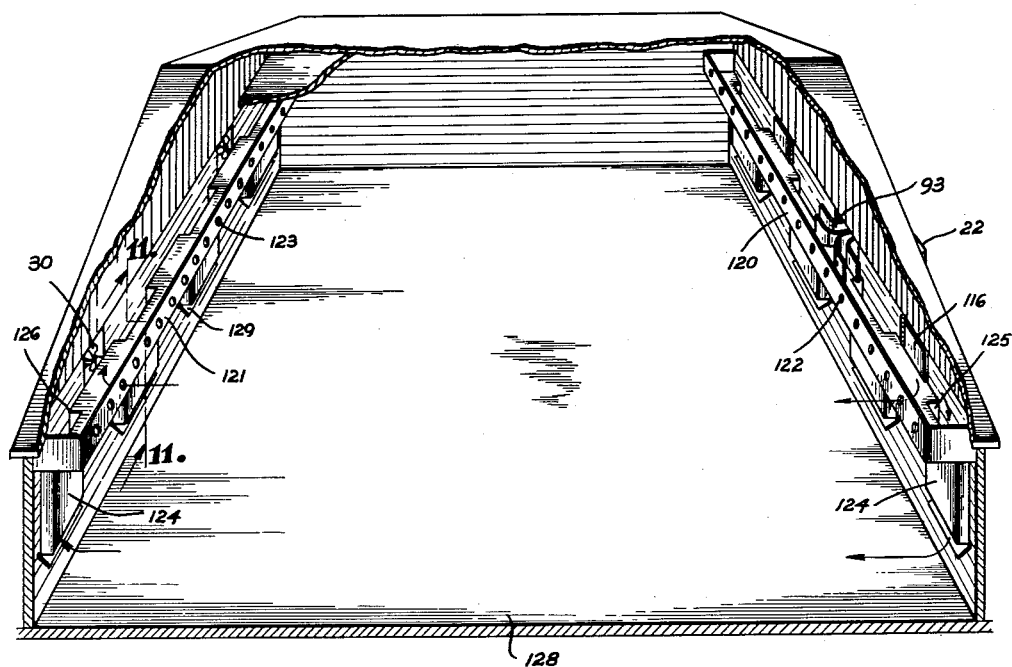
FIG. 10 is a perspective view of a poultry or animal house showing a further modified form of ducts therein.
Figure 11:
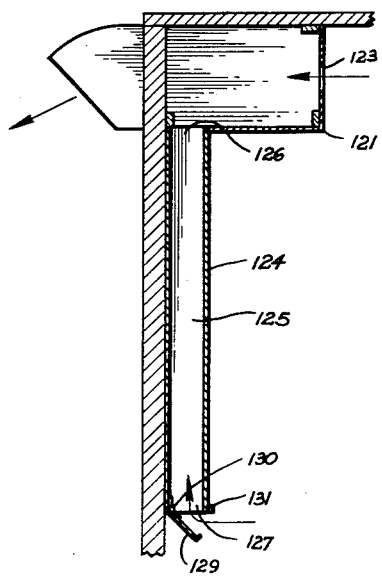
FIG. 11 is a vertical sectional view through the ducts on the line 11—11, FIG. 10.

In the form of the invention illustrated in FIGS. 10 and 11, the inlet ducts 120 and outlet ducts 121 are arranged relative to an air conditioner 22 and exhaust fans 30 respectively in a similar manner to the ducts illustrated in FIG. 5, and said duct walls are of substantially the same construction. However, as illustrated in FIG. 10, the inlet duct 120 has a plurality of ports or holes 122 arranged in the side wall of the duct, and the exhaust duct has a plurality of ports or openings 123 spaced therealong in the side wall. Each of the inlet and outlet ducts 120 and 121 have downward extensions 124 adjacent the respective building wall and each extension has a passage 125 therein communicating with the interior of the respective duct as at 126. The passages 125 communicate with the interior of the building through bottom openings 127 in the respective extensions, said extensions being of a length whereby the lower ends thereof are at suitable heights from the floor 128 for desired stratification or movement of air through the lower portion of the room. A closure 129 is pivotally mounted as at 130 on the bottom of the extensions for closing the opening 127 when desired, a suitable latch 131 being applied to the extensions for holding the closure 129 in closing position whereby when the openings in the bottoms of the extensions are closed the air movement across the room will be in the upper levels moving from the inlet duct 120 through the ports 122 across the room and entering the exhaust duct 121 through the ports 123. In the illustrated structure, the vanes 93 for directing the air supplied by the air conditioner are used in the inlet duct and there are also doors 116 for controlling direct communication from the exterior of the building to the inlet duct as described relative to the forms of the invention illustrated in FIGS. 7 to 9 inclusive. The operation and control of the various motors for the blower, pumps and exhaust fans are substantially the same as described relative to the form of the invention illustrated in FIGS. 1 to 4 inclusive.

It is to be understood that while we have illustrated and described certain forms of our invention, it is not to be limited to the specific form or arrangement of parts herein described and shown except insofar as such limitations are included in the claims.

What we claim and desire to secure by Letters Patent is:

1. A ventilated housing comprising a building structure enclosing a substantially sealed three-dimensional volume of space including circumferential side walls, a floor and an overhead wall, a horizontal intake duct positioned adjacent the overhead wall, mounted adjacent to a side wall of the building and extending substantially the length thereof, said intake duct having a plurality of laterally spaced ports in the underside thereof adapted to discharge air therefrom substantially vertically downwardly in said building, a first conduit communicating with the building exterior connected to said intake duct and adapted to discharge air thereinto from the building exterior, a first blower means communicating with said first conduit adapted to move air therethrough from the building exterior to the intake duct at at least two speeds, the higher of said speeds sufficient to flow air from said underside ports substantially to the floor of said building adjacent the side walls thereof, the lower of said speeds sufficient only to move air out of said underside ports and no substantial distance below said duct, a discharge conduit from said building interior to the exterior thereof, said discharge conduit laterally displaced from the intake duct and communicating with the interior of the building at substantially the same vertical level as said duct and a second blower means communicating with said discharge conduit and operative to move air therethrough from the interior of the building to the exterior thereof at at least two speeds, the lower of said speeds operable to effectively exhaust air input at the lower speed of the first blower and the upper of said speeds operable to effectively exhaust air input at the higher speed of the first blower and control means for separately actuating said blower means and controlling the velocities thereof.

2. A ventilated housing comprising a building structure having side and end walls, a floor and an overhead wall whereby to enclose and substantially seal a three-dimensional volume of space, a horizontally extending intake duct positioned adjacent one of said walls, at least some portion of said duct extending vertically a substantial portion of the height of said wall, said intake duct having a plurality of sets of laterally spaced ports in the vertically extending wall portion thereof adapted to discharge air therefrom at a plurality of vertical levels, means associated with said ports for separately controlling the flow of air from said sets of ports, a first conduit communicating with the building exterior connected to said intake duct and adjusted to discharge air thereinto from the building exterior, a first blower means communicating with said first conduit adapted to move air therethrough from the building exterior to said intake duct, and a discharge conduit from said building interior to the exterior thereof, said discharge conduit laterally displaced from the intake duct and communicating with the interior of the buildings at at least one substantially same vertical level as one set of ports in said intake duct, and a second blower means communicating with said discharge conduit and operative to move air therethrough from the interior of the building to the exterior thereof, and control means for separately actuating said blower means.

3. A housing as in claim 2 wherein said discharge conduit includes a horizontal discharge duct positioned adjacent the wall opposite that next the horizontal intake duct, said discharge duct having at least some portion thereof extending vertically a substantial portion of the height of said wall, a plurality of sets of laterally spaced ports in the vertically extending portion of the wall of said discharge duct, each set at a different vertical level therein adapted to receive air therethrough from the interior of the building, and means associated with said ports for separately controlling flow through said sets of ports in said discharge duct.

References Cited in the file of this patent

UNITED STATES PATENTS

| | | |
|---|---|---|
| 1,138,470 | Hackney | May 4, 1915 |
| 1,230,282 | Currier | June 19, 1917 |
| 1,520,231 | Fleisher | Dec. 23, 1924 |
| 1,842,286 | Potter | Jan. 19, 1932 |
| 2,497,947 | Lewis | Feb. 21, 1950 |
| 2,510,524 | Schramm | June 6, 1950 |
| 2,625,095 | Julian | Jan. 13, 1953 |
| 2,702,503 | Wildhaber | Feb. 22, 1955 |
| 2,725,729 | Mills | Dec. 6, 1955 |
| 2,734,444 | Lunn | Feb. 14, 1956 |